United States Patent Office 3,323,484
Patented June 6, 1967

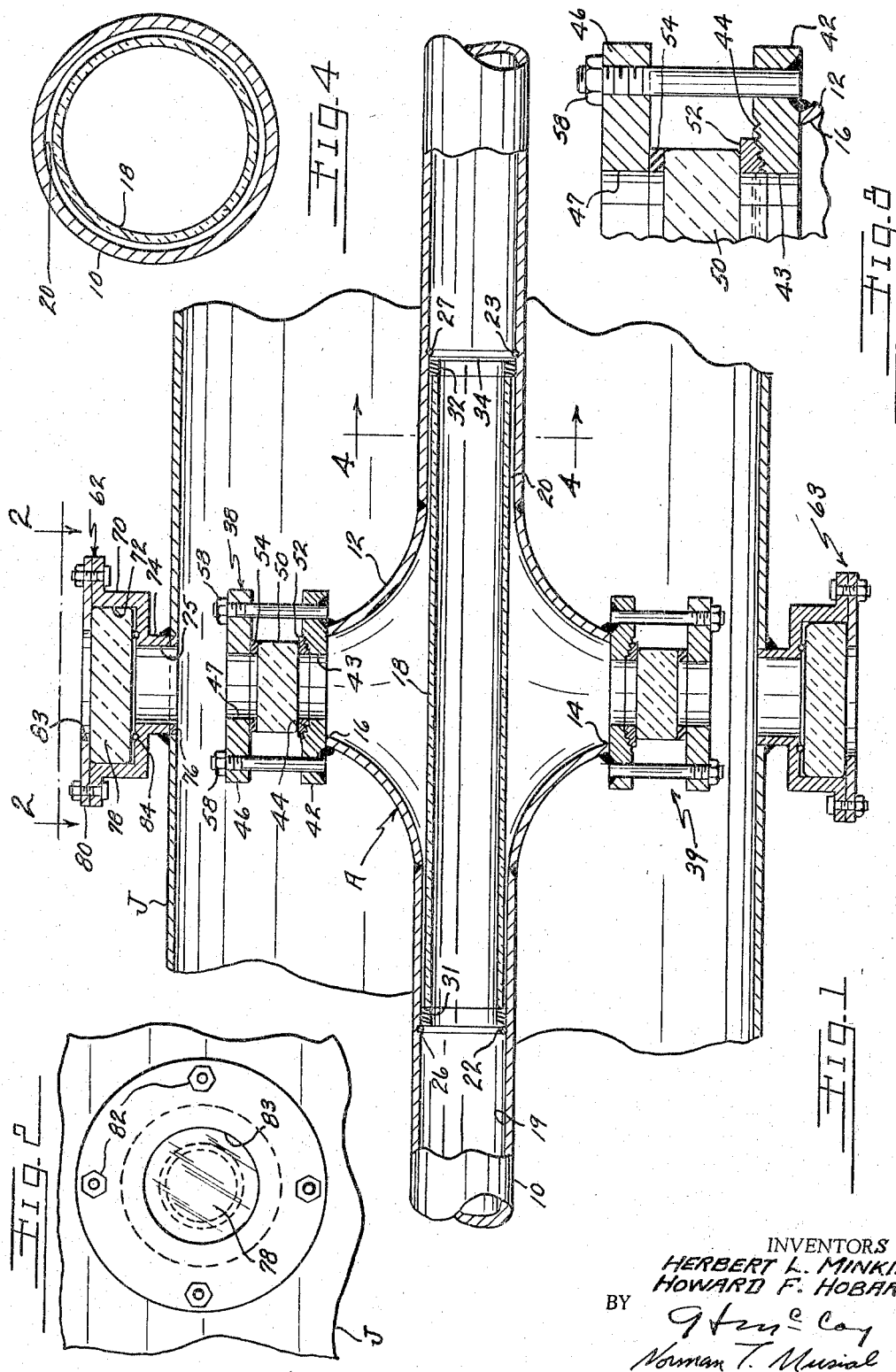

3,323,484
LIQUID FLOW SIGHT ASSEMBLY
Herbert L. Minkin, Shaker Heights, and Howard F. Hobart, Bay Village, Ohio, assignors to the United States of America as represented by the Administrator of the National Aeronautics and Space Administration
Filed Dec. 27, 1965, Ser. No. 516,794
10 Claims. (Cl. 116—117)

The invention described herein may be manufactured and used by or for the Government of the United States of America for Governmental purposes without the payment of any royalties thereon or therefor.

This invention relates to a liquid flow sight assembly and more particularly to a high pressure cryogenic observation window for viewing the flow of pressurized fluids. In conventional fluid flow sight indicators, the flowing pressurized fluid is channeled through a thin-walled glass tube through which the fluid is directly viewed. Such structures are limited to low pressure fluids because of the inherent weakness of the glass tube. Additionally, such prior structures cannot handle extremely hot or extremely cold fluids because of undue expansion and/or contraction of the parts thereof. Also, prior structures contain obstructions in the line of fluid flow causing eddying and turbulence at the viewing sight.

An object of the present invention is to provide a fluid flow sight assembly of thin-walled glass tube construction that can accommodate high pressure fluids.

A further object of the invention is to provide a fluid flow sight assembly of the above type that can accommodate fluids of a wide range of temperatures.

A further object of the invention is to provide a fluid flow sight assembly of the above type that is simple in construction, inexpensive to manufacture, and highly effective in operation.

A further object of the invention is to provide a fluid flow sight assembly of the above type effecting uninterrupted or streamlined flow of fluid through the sight assembly thereby preventing eddying and turbulence therein.

Briefly, the foregoing objects are accomplished by the provision of a fluid flow sight assembly including a fluid conduit having an enlarged portion with oppositely disposed sight members therein for viewing fluid flow. The enlarged portion contains a thin-walled glass tube (of preselected length and of less cross-sectional size than the conduit) longitudinally disposed in the enlarged portion and extending, at each of its ends, into the adjacent conduit. The glass tube is retained in position by snap rings detachably secured to the inner conduit wall at each end of the tube, with at least one end of the glass tube being spaced from its adjacent snap ring. The glass tube is dimensioned in length and in cross-sectional size to provide a controlled leak for flow of pressurized fluid to the conduit enlarged portion (to the exterior of the glass tube) to equalize fluid pressure interiorly and exteriorly of such tube to prevent breakage thereof. The fluid flow sight assemb may be retained in a vacuum jacket containing a vacuum for minimizing heat transfer, such being a necessary requirement in cryogenic flow. The vacuum jacket has oppositely disposed sight members in alignment with the conduit sight members for viewing liquid flow exteriorly of the jacket.

Thus, with the above structure, fluids having a wide range of pressures and temperatures can be accommodated and fluid turbulence is eliminated, such structure being formed entirely of relatively inexpensive components.

Other objects and advantages of the invention will be apparent from the following description taken in conjunction with the drawings wherein:

FIG. 1 is a front elevational sectional view of a fluid flow sight assembly constructed in accordance with the invention;

FIG. 2 is a portional top view of the assembly shown in FIG. 1 and taken along the line 2—2 thereof;

FIG. 3 is an enlarged broken sectional view of the right portion of the upper conduit sight member shown in FIG. 1; and FIG. 4 is a view taken along the line 4—4 of FIG. 1.

Although the invention is shown and described herein with reference to a fluid flow sight assembly for viewing liquid hydrogen, it will be understood that the invention may be applied to any type of fluid flow sight indicator accommodating fluids of very wide ranges of temperatures and pressures.

Referring to the drawings, there is shown a fluid flow sight assembly, generally designated as A, and which is enclosed in a vacuum jacket designated as J.

The assembly A, in the preferred form, includes a fluid conduit 10 having an enlarged portion 12 with aligned oppositely spaced sight openings 14 and 16 therein. A substantially transparent tube 18, of preselected length, is longitudinally disposed in the bore 19 of the conduit 10 with the central portion of the tube being positioned in the conduit enlarged portion 12 and with the end portions of the tube being positioned in the conduit as shown. Thus, the tube 18 conducts the pressurized fluid in series with the conduit 10. The tube 18 is preferably formed of thin-walled glass, although any similar substantially transparent material may be used such as, for example, Pyrex (registered trademark). Also, the tube 18 is of less cross-sectional size than the conduit 10 to provide a clearance 20 between the outer longitudinal wall of the tube and the inner longitudinal wall of the conduit, such clearance, in the preferred form, being on the order of 0.005 inch.

The tube 18 is retained in the conduit 10 by a conduit retaining means in the form of a pair of spaced snap rings 22 and 23 which are positioned in annular transverse grooves 26 and 27, respectively, formed in the inner longitudinal wall of the conduit 10. Suitable annular semi-resilient buffer rings 31 and 32, of preselected size, are interposed between the snap rings 22 and 23 and the respective ends of the tube. 18. The glass tube 18 is of preselected length to provide a passageway 34 thereby allowing the tube to float or move longitudinally back and forth between the snap rings a limited amount to allow for temperature expansion and contraction of the tube. This construction also permits slight fluid flow through a controlled leak around the end of the glass tube and/or around the buffer rings and thence through the clearance 20 to the enlarged portion 12, thereby equalizing fluid pressure interiorly and exteriorly of the tube to prevent breakage of the same. Also with such structure the sight assembly is free of internal fluid flow obstruction, thereby preventing eddying and turbulence therethrough.

The sight openings 16 and 14 contain aligned oppositely disposed sight members, generally designated as 38 and 39 respectively, for viewing the flow of pressurized fluid in the glass tube 18. Although only one of the sight members (sight member 38, for example) is necessary for viewing fluid flow, the use of a second oppositely disposed sight member 39 permits the use of an associated source of light to be shown through the second sight member and onto the glass tube 18 to better view fluid flow therethrough. Since both sight members 38 and 39 are similar in construction, only one will be described in detail.

The sight member 38 includes a first annular plate 42 secured to the periphery of the sight opening 16 to form a fluidtight seal therewith. The plate 42 has a centralized aperture 43 in line with the sight opening 16, said plate having a series of preconfigured serrations 44 around the periphery of the aperture 43. Disposed above the plate 42, in parallel spaced relation thereto, is a second plate 46 having a centralized aperture 47 in line with the aperture 43 and the sight opening 16. Interposed between the plates 42 and 46 is a substantially transparent means such as, for example, the quartz glass plate 50. A lead gasket 52 is positioned on the serrations 44 between the lower surface of the glass 50 and the plate 42 to form a fluid-tight seal therebetween. A resilient gasket 54 is interposed between the top surface of the glass 50 and the plate 46. The plates 42 and 46, with the glass 50 and its respective gaskets 52 and 54 therebetween, are clamped together under controlled compression by any suitable means such as the bolts 58.

For minimizing the heat transfer by gas conduction to the fluid conduit, assembly A is maintained in a vacuum contained in a vacuum jacket J which encloses the assembly A. Disposed on the jacket J are a pair of aligned oppositely disposed jacket sight members, designated generally as 62 and 63, which are positioned in line with the sight members 38 and 39. Although only one of the jacket sight members (sight member 62, for example), is necessary for viewing fluid flow, the use of a second oppositely disposed sight member 63 permits the use of an associated source of light to be shown through the second sight member to better view fluid flow. Since both of sight members 62 and 63 are similar in construction, only one will be described in detail.

Sight member 62 includes a sleeve 70 having a bore 72 and having a restricted portion 74 disposed in the jacket sight opening 76. The restricted portion 74 has a bore 75 in line with the sight member 38. A substantially transparent member in the form of the glass plate 78 is disposed in the bore 72 and retained therein by the annular plate 80 which is secured to the sleeve 70 by the bolts 82. The plate 80 has a centralized aperture 83. An O-ring 84 is disposed between the glass plate 78 and the shoulder 86 of the sleeve 70 to provide a vacuum-tight seal therebetween.

In practice, the present construction is adapted to accommodate liquid hydrogen flowing through the conduit 10 and through the thin-walled glass tube 18 at pressures up to 50 p.s.i.a., free of turbulence. Ordinarily, such pressures would easily break the glass 18 if pressure interiorly and exteriorly thereof were not equalized as provided by the present structure. The invention obviates the necessity of bonding glass tubing to metal which is a difficult and expensive operation. Also, thin-walled glass tubing does not impair observation as is the case with thick or heavy-wall glass tubing.

The terms and expressions which have been employed are used as terms of description, and not of limitation, and there is no intention, in the use of such terms and expressions, of excluding any equivalents of the features shown and described, or portions thereof, but it is recognized that various modifications are possible within the scope of the invention claimed.

What is claimed is:

1. A fluid flow sight assembly for viewing the flow of pressurized fluid comprising, a fluid conduit for conducting pressurized fluid and having a sight opening therein, a sight member disposed in said opening, a substantially transparent tube of preselected length and of less cross-sectional size than the conduit and disposed longitudinally in the conduit opposite said sight member for conducting the pressurized fluid in series with the conduit, said tube dimensioned to provide slight fluid flow exteriorly of the tube thereby equalizing pressure interiorly and exteriorly of such tube to prevent breakage thereof by the pressurized fluid, and means for retaining the tube in the conduit.

2. The structure of claim 1 wherein said conduit and said tube are circular in cross-section and said means includes a pair of spaced annular transverse grooves formed in the inner longitudinal wall of the conduit, and snap rings disposed in said grooves, said tube being disposed between the snap rings whereby at least one end of the tube is spaced slightly from the adjacent snap ring to provide a passageway for the pressurized fluid to flow around the end of the tube to the tube exterior to equalize pressure on the same.

3. The structure of claim 2 wherein the tube is dimensioned cross-sectionally to provide a clearance between the inner longitudinal wall of the conduit and the outer longitudinal wall of the tube of approximately 0.005 inch.

4. The structure of claim 2 wherein an annular semi-resilient buffer ring is disposed between each snap ring and the adjacent end of the tube, said buffer ring being of preselected size to permit fluid flow therearound to the tube exterior to equalize pressure thereon.

5. The structure of claim 1 wherein said transparent tube is a relatively thin-walled glass tube.

6. The structure of claim 1 wherein said fluid conduit has a second sight opening transversely and oppositely disposed from the first-named sight opening, and a sight member disposed in said second opening whereby the flowing pressurized fluid may be viewed from either side of the conduit and whereby light may be directed on the tube through one of the sight openings to better view fluid flow through the tube.

7. The structure of claim 1 wherein said conduit has an enlarged portion containing at least the central portion of the transparent tube and containing said sight opening with the sight member therein, said tube being dimensioned cross-sectionally to provide a controlled leak from the conduit interior to the enlarged portion to equalize pressure on the tube.

8. The structure of claim 1 wherein said sight member comprises, a first plate secured to the periphery of the sight opening and having a centralized aperture in line with the sight opening, said plate having preconfigured serrations formed around the periphery of the aperture, a second plate spaced from the first plate and having a centralized aperture in line with the sight opening, substantially transparent means disposed between said plates in line with said aperture, a semi-resilient gasket disposed between the transparent means and the plate serrations, and means for securing the plates together with the transparent means and the gasket interposed therebetween under controlled compression.

9. The structure of claim 1 wherein said sight assembly is enclosed in a vacuum jacket containing a vacuum for minimizing heat transfer to the sight assembly, said vacuum jacket having at least one sight member in line with the sight assembly sight member for viewing fluid flow in the tube.

10. The structure of claim 1 wherein said conduit has an enlarged portion containing the central portion of the transparent tube, said conduit and its enlarged portion and said tube being circular in cross-section, said tube being dimensioned cross-sectionally to provide a clearance between the inner longitudinal wall of the conduit and the outer longitudinal wall of the tube of approximately 0.005 inch, said enlarged portion having aligned oppositely-disposed sight openings therein, a sight member disposed in each of said sight openings, said means for retaining the tube in the opening including a pair of spaced annular transverse grooves formed in the inner longitudinal wall of the conduit, snap rings disposed in said grooves, said tube disposed between the snap rings, an annular semi-resilient buffer ring disposed between each snap ring and the adjacent end of the tube, said buffer ring being of preselected size and said tube being of preselected length to provide a passageway for the pressurized fluid to flow around the end of the tube to the exterior of the tube to equalize pressure on the same, a vacuum jacket containing a vacuum enclosing said fluid flow sight assembly for minimizing heat transfer to the sight assembly, and a pair of aligned oppositely-disposed sight members contained in said vacuum jacket and in alignment with said first-named sight members for viewing fluid flow in the tube.

No references cited.

LOUIS J. CAPOZI, *Primary Examiner*.